United States Patent
Li et al.

(10) Patent No.: US 9,823,059 B2
(45) Date of Patent: Nov. 21, 2017

(54) DIMENSIONING SYSTEM WITH GUIDED ALIGNMENT

(71) Applicant: Hand Held Products, Inc., Fort Mill, SC (US)

(72) Inventors: Jingquan Li, Auburn, NY (US); Brian L. Jovanovski, Syracuse, NY (US); Scott McCloskey, Minneapolis, MN (US); Ryan Andrew Lloyd, Burnsville, MN (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/453,019

(22) Filed: Aug. 6, 2014

(65) Prior Publication Data

US 2016/0040982 A1 Feb. 11, 2016

(51) Int. Cl.
| | |
|---|---|
| *G01B 11/02* | (2006.01) |
| *G01S 7/481* | (2006.01) |
| *G01S 17/42* | (2006.01) |
| *G01S 7/497* | (2006.01) |
| *G01S 17/46* | (2006.01) |
| *G01S 17/89* | (2006.01) |

(52) U.S. Cl.
CPC .......... *G01B 11/026* (2013.01); *G01S 7/4972* (2013.01); *G01S 17/46* (2013.01); *G01S 17/89* (2013.01)

(58) Field of Classification Search
CPC ... G01B 11/026; G01S 7/4813; G01S 7/4972; G01S 17/42; G01S 17/89; G06T 2207/10028; G06T 2207/10048
USPC .......... 356/601–625, 5.01, 4.1; 438/46, 135; 382/103, 132, 154
See application file for complete search history.

(56) References Cited

U.S. PATENT DOCUMENTS

| | | | |
|---|---|---|---|
| 3,971,065 | A | 7/1976 | Bayer |
| 4,279,328 | A | 7/1981 | Ahlbom |
| 4,398,811 | A | 8/1983 | Nishioka et al. |
| 4,495,559 | A | 1/1985 | Gelatt, Jr. |
| 4,730,190 | A | 3/1988 | Win et al. |
| 4,803,639 | A | 2/1989 | Steele et al. |
| 5,184,733 | A | 2/1993 | Arnarson et al. |
| 5,220,536 | A | 6/1993 | Stringer et al. |

(Continued)

FOREIGN PATENT DOCUMENTS

| | | |
|---|---|---|
| AU | 2004212587 A1 | 4/2005 |
| CN | 201139117 Y | 10/2008 |

(Continued)

OTHER PUBLICATIONS

U.S. Appl. No. 14/274,858 for Mobile Printer With Optional Battery Accessory, filed May 12, 2014, (Marty et al.); 26 pages.

(Continued)

*Primary Examiner* — Sang Nguyen
(74) *Attorney, Agent, or Firm* — Additon, Higgins & Pendleton, P.A.

(57) ABSTRACT

A dimensioning system including a computing device running an alignment software program is disclosed. The alignment software uses range information from a range sensor in order to generate alignment messages. The alignment messages may help a user define a frame of reference and align the dimensioning system's range sensor for improved dimensioning performance.

19 Claims, 4 Drawing Sheets

(56) References Cited

U.S. PATENT DOCUMENTS

| | | |
|---|---|---|
| 5,331,118 A | 7/1994 | Jensen |
| 5,359,185 A | 10/1994 | Hanson |
| 5,384,901 A | 1/1995 | Glassner et al. |
| 5,548,707 A | 8/1996 | LoNegro |
| 5,555,090 A | 9/1996 | Schmutz |
| 5,561,526 A | 10/1996 | Huber et al. |
| 5,590,060 A | 12/1996 | Granville et al. |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,767,962 A | 6/1998 | Suzuki et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Chaki |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 * | 1/2003 | Yagi .................. G01C 11/06 356/602 |
| 6,517,004 B2 | 2/2003 | Good et al. |
| 6,519,550 B1 | 2/2003 | D'Hooge et al. |
| 6,674,904 B1 | 1/2004 | McQueen |
| 6,705,526 B1 | 3/2004 | Zhu et al. |
| 6,781,621 B1 | 8/2004 | Gobush et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Zhu et al. |
| 7,137,556 B1 | 11/2006 | Bonner et al. |
| 7,159,783 B2 | 1/2007 | Walczyk et al. |
| 7,161,688 B1 | 1/2007 | Bonner et al. |
| 7,205,529 B2 | 4/2007 | Andersen et al. |
| 7,214,954 B2 | 5/2007 | Schopp |
| 7,277,187 B2 | 10/2007 | Smith et al. |
| 7,307,653 B2 | 12/2007 | Dutta |
| 7,310,431 B2 | 12/2007 | Gokturk et al. |
| 7,413,127 B2 | 8/2008 | Ehrhart et al. |
| 7,527,205 B2 | 5/2009 | Zhu et al. |
| 7,586,049 B2 | 9/2009 | Wurz |
| 7,602,404 B1 | 10/2009 | Reinhardt et al. |
| 7,639,722 B1 | 12/2009 | Paxton et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,974,025 B2 | 7/2011 | Topliss |
| 8,027,096 B2 | 9/2011 | Feng et al. |
| 8,028,501 B2 | 10/2011 | Buckley et al. |
| 8,050,461 B2 | 11/2011 | Shpunt |
| 8,055,061 B2 | 11/2011 | Katano |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,212,889 B2 | 7/2012 | Chanas et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,322,622 B2 | 12/2012 | Liu |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |

(56) References Cited

U.S. PATENT DOCUMENTS

| | | |
|---|---|---|
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1* | 8/2014 | Hilde ................ G06K 9/00214 356/3.01 |
| 8,820,630 B2 | 9/2014 | Qu et al. |
| 8,897,596 B1 | 11/2014 | Passmore et al. |
| 9,014,441 B2 | 4/2015 | Truyen et al. |
| 9,082,195 B2 | 7/2015 | Holeva et al. |
| 9,142,035 B1 | 9/2015 | Rotman |
| 9,233,470 B1 | 1/2016 | Bradski et al. |
| 9,299,013 B1 | 3/2016 | Curlander et al. |
| 9,424,749 B1 | 8/2016 | Reed et al. |
| 9,486,921 B1 | 11/2016 | Straszheim et al. |
| 2001/0027995 A1 | 10/2001 | Patel et al. |
| 2001/0032879 A1 | 10/2001 | He et al. |
| 2002/0054289 A1 | 5/2002 | Thibault et al. |
| 2002/0109835 A1 | 8/2002 | Goetz |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1* | 6/2005 | Lange ................... G02B 27/22 359/462 |
| 2005/0128196 A1 | 6/2005 | Popescu et al. |
| 2005/0168488 A1 | 8/2005 | Montague |
| 2005/0211782 A1 | 9/2005 | Martin |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0232681 A1 | 10/2006 | Okada |
| 2006/0255150 A1 | 11/2006 | Longacre |
| 2006/0269165 A1 | 11/2006 | Viswanathan |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |

(56) References Cited

U.S. PATENT DOCUMENTS

| | | |
|---|---|---|
| 2008/0035390 A1 | 2/2008 | Wurz |
| 2008/0056536 A1 | 3/2008 | Hildreth et al. |
| 2008/0062164 A1 | 3/2008 | Bassi et al. |
| 2008/0077265 A1 | 3/2008 | Boyden |
| 2008/0079955 A1 | 4/2008 | Storm |
| 2008/0164074 A1 | 7/2008 | Wurz |
| 2008/0185432 A1 | 8/2008 | Caballero et al. |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0059004 A1 | 3/2009 | Bochicchio |
| 2009/0095047 A1 | 4/2009 | Patel et al. |
| 2009/0134221 A1 | 5/2009 | Zhu et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 * | 11/2009 | Bauhahn ............... G01C 3/08 356/5.01 |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 * | 7/2010 | Prokoski ............ A61B 5/0064 382/132 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Arnz |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0043609 A1 | 2/2011 | Choi et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0138685 A1 | 6/2012 | Qu et al. |
| 2012/0140300 A1 | 6/2012 | Freeman |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 8/2012 | Rodriguez et al. |
| 2012/0223141 A1 | 9/2012 | Good et al. |
| 2012/0224026 A1 | 9/2012 | Bayer et al. |
| 2012/0228382 A1 | 9/2012 | Havens et al. |
| 2012/0236288 A1 | 9/2012 | Stanley |
| 2012/0242852 A1 | 9/2012 | Hayward et al. |
| 2012/0248188 A1 | 10/2012 | Kearney |
| 2012/0256901 A1 | 10/2012 | Bendall |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0294549 A1 | 11/2012 | Doepke |
| 2012/0299961 A1 | 11/2012 | Ramkumar et al. |
| 2012/0300991 A1 | 11/2012 | Free |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0094069 A1 | 4/2013 | Lee et al. |
| 2013/0101158 A1 * | 4/2013 | Lloyd ................. G06T 7/602 382/103 |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0200158 A1 | 8/2013 | Feng et al. |
| 2013/0201288 A1 | 8/2013 | Billerbeck et al. |
| 2013/0208164 A1 | 8/2013 | Cazier et al. |
| 2013/0211790 A1 | 8/2013 | Loveland et al. |
| 2013/0223673 A1 | 8/2013 | Davis et al. |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedrao |
| 2013/0307964 A1 | 11/2013 | Bremer et al. |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0313325 A1 | 11/2013 | Wilz et al. |

(56) References Cited

U.S. PATENT DOCUMENTS

| | | |
|---|---|---|
| 2013/0329012 A1* | 12/2013 | Bartos ............ H04N 13/0246 348/46 |
| 2013/0329013 A1 | 12/2013 | Metois et al. |
| 2013/0341399 A1 | 12/2013 | Xian et al. |
| 2013/0342342 A1 | 12/2013 | Sabre et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0009586 A1 | 1/2014 | McNamer et al. |
| 2014/0021259 A1 | 1/2014 | Moed et al. |
| 2014/0025584 A1 | 1/2014 | Liu et al. |
| 2014/0027518 A1 | 1/2014 | Edmonds et al. |
| 2014/0031665 A1 | 1/2014 | Pinto et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061305 A1 | 3/2014 | Nahill et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0091147 A1 | 4/2014 | Evans et al. |
| 2014/0097249 A1 | 4/2014 | Gomez et al. |
| 2014/0098091 A1 | 4/2014 | Hori |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1* | 4/2014 | McCloskey ......... G06Q 10/083 348/135 |
| 2014/0104416 A1* | 4/2014 | Giordano ............ G01B 11/02 348/135 |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Takahashi |
| 2014/0140585 A1 | 5/2014 | Wang |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0160329 A1 | 6/2014 | Ren et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166760 A1 | 6/2014 | Meier et al. |
| 2014/0166761 A1 | 6/2014 | Todeschini et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175169 A1 | 6/2014 | Kosecki et al. |
| 2014/0175172 A1 | 6/2014 | Jovanovski et al. |
| 2014/0175174 A1 | 6/2014 | Barber |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0240464 A1 | 8/2014 | Lee |
| 2014/0247279 A1 | 9/2014 | Nicholas et al. |
| 2014/0247280 A1 | 9/2014 | Nicholas et al. |
| 2014/0267609 A1 | 9/2014 | Laffargue |
| 2014/0268093 A1 | 9/2014 | Tohme et al. |
| 2014/0270361 A1 | 9/2014 | Amma et al. |
| 2014/0306833 A1 | 10/2014 | Ricci |
| 2014/0307855 A1 | 10/2014 | Withagen et al. |
| 2014/0313527 A1 | 10/2014 | Askan |
| 2014/0319219 A1 | 10/2014 | Liu et al. |
| 2014/0320408 A1 | 10/2014 | Zagorsek et al. |
| 2014/0347553 A1 | 11/2014 | Ovsiannikov et al. |
| 2014/0350710 A1 | 11/2014 | Gopalakrishnan et al. |
| 2014/0379613 A1 | 12/2014 | Nishitani et al. |
| 2015/0009301 A1 | 1/2015 | Ribnick et al. |
| 2015/0009338 A1 | 1/2015 | Laffargue et al. |
| 2015/0036876 A1 | 2/2015 | Marrion et al. |
| 2015/0049347 A1 | 2/2015 | Laffargue et al. |
| 2015/0062369 A1 | 3/2015 | Gehring et al. |
| 2015/0063676 A1 | 3/2015 | Lloyd et al. |
| 2015/0116498 A1 | 4/2015 | Vartiainen et al. |
| 2015/0149946 A1 | 5/2015 | Benos et al. |
| 2015/0163474 A1 | 6/2015 | You |
| 2015/0204662 A1 | 7/2015 | Kobayashi et al. |
| 2015/0213647 A1 | 7/2015 | Laffargue et al. |
| 2015/0229838 A1 | 8/2015 | Hakim et al. |
| 2015/0269403 A1 | 9/2015 | Lei et al. |
| 2015/0276379 A1 | 10/2015 | Ni et al. |
| 2015/0301181 A1 | 10/2015 | Herschbach |
| 2015/0308816 A1 | 10/2015 | Laffargue et al. |
| 2015/0325036 A1 | 11/2015 | Lee |
| 2015/0355470 A1 | 12/2015 | Herschbach |
| 2016/0048725 A1 | 2/2016 | Holz et al. |
| 2016/0063429 A1 | 3/2016 | Varley et al. |
| 2016/0090283 A1 | 3/2016 | Svensson et al. |
| 2016/0090284 A1 | 3/2016 | Svensson et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0169665 A1 | 6/2016 | Deschenes et al. |
| 2016/0187186 A1 | 6/2016 | Coleman et al. |
| 2016/0187210 A1 | 6/2016 | Coleman et al. |

(56) References Cited

U.S. PATENT DOCUMENTS

| | | |
|---|---|---|
| 2016/0191801 A1 | 6/2016 | Sivan |
| 2016/0202478 A1 | 7/2016 | Masson et al. |
| 2017/0115490 A1 | 4/2017 | Hsieh et al. |

FOREIGN PATENT DOCUMENTS

| | | | |
|---|---|---|---|
| DE | 3335760 | A1 | 4/1985 |
| DE | 10210813 | A1 | 10/2003 |
| DE | 102007037282 | A1 | 3/2008 |
| EP | 1111435 | A2 | 6/2001 |
| EP | 1443312 | A1 | 8/2004 |
| EP | 2286932 | A2 | 2/2011 |
| EP | 2381421 | A2 | 10/2011 |
| EP | 2533009 | A2 | 12/2012 |
| EP | 2722656 | A1 | 4/2014 |
| EP | 2779027 | A1 | 9/2014 |
| EP | 2833323 | A2 | 2/2015 |
| EP | 2843590 | A1 | 3/2015 |
| EP | 2845170 | A1 | 3/2015 |
| EP | 2966595 | A1 | 1/2016 |
| EP | 3006893 | A1 | 3/2016 |
| EP | 3012601 | A1 | 3/2016 |
| EP | 3007096 | A1 | 4/2016 |
| GB | 2503978 | A | 1/2014 |
| GB | 2531928 | A | 5/2016 |
| JP | H04129902 | A | 4/1992 |
| JP | 2008210276 | A | 9/2008 |
| JP | 2014210646 | A | 11/2014 |
| KR | 20100020115 | A | 2/2010 |
| KR | 20110013200 | A | 2/2011 |
| KR | 20110117020 | A | 10/2011 |
| KR | 20120028109 | A | 3/2012 |
| WO | 96/40452 | A1 | 12/1996 |
| WO | 0114836 | A1 | 3/2001 |
| WO | 2006095110 | A1 | 9/2006 |
| WO | 2007015059 | A1 | 2/2007 |
| WO | 2011017241 | A1 | 2/2011 |
| WO | 2012175731 | A1 | 12/2012 |
| WO | 2013021157 | A1 | 2/2013 |
| WO | 2013033442 | A1 | 3/2013 |
| WO | 2013163789 | A1 | 11/2013 |
| WO | 2013166368 | A1 | 11/2013 |
| WO | 2013173985 | A1 | 11/2013 |
| WO | 20130184340 | A1 | 12/2013 |
| WO | 2014019130 | A1 | 2/2014 |
| WO | 2014102341 | A1 | 7/2014 |
| WO | 2014110495 | A1 | 7/2014 |
| WO | 2014149702 | A1 | 9/2014 |
| WO | 2014151746 | A2 | 9/2014 |
| WO | 2015006865 | A1 | 1/2015 |
| WO | 2016020038 | A1 | 2/2016 |
| WO | 2016061699 | A1 | 4/2016 |

OTHER PUBLICATIONS

U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 29/492,903 for an Indicia Scanner, filed Jun. 4, 2014 (Zhou et al.); 23 pages.
U.S. Appl. No. 29/494,725 for an In-Counter Barcode Scanner, filed Jun. 24, 2014 (Oberpriller et al.); 23 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 14/339,708 for Laser Scanning Code Symbol Reading System, filed Jul. 24, 2014 (Xian et al.); 39 pages.
U.S. Appl. No. 14/379,057 for Method of Using Camera Sensor Interface to Transfer Multiple Channels of Scan Data Using an Image Format filed Aug. 15, 2014 (Wang et al.); 28 pages.
U.S. Appl. No. 14/283,282 for Terminal Having Illumination and Focus Control filed May 21, 2014 (Liu et al.); 31 pages.
U.S. Appl. No. 14/490,989, not yet published, filed Sep. 19, 2014, Intermec IP Corporation, Volume Dimensioning System Calibration Systems and Methods.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
U.S. Appl. No. 14/519,179, Serge Thuries et al., filed Oct. 21, 2014, not published yet. 40 pages.
U.S. Appl. No. 14/519,249, H. Sprague Ackley et al., filed Oct. 21, 2014, not published yet. 36 pages.
U.S. Appl. No. 14/519,233, Franck Laffargue et al., filed Oct. 21, 2014, not published yet. 34 pages.
U.S. Appl. No. 14/519,211, H. Sprague Ackley et al., filed Oct. 21, 2014, not published yet. 33 pages.
U.S. Appl. No. 14/519,195, Franck Laffargue et al., filed Oct. 21, 2014, not published yet. 35 pages.
U.S. Appl. No. 13/367,978, filed Feb. 7, 2012, (Feng et al.); now abandoned.
U.S. Appl. No. 14/376,472, for an Encoded Information Reading Terminal Including Http Server filed Aug. 4, 2014, (Lu); 30 pages.
U.S. Appl. No. 13/771,508 for an Optical Redirection Adapter, filed Feb. 20, 2013 (Anderson); 26 pages.
U.S. Appl. No. 14/340,716 for an Optical Imager and Method for Correlating a Medication Package With a Patient, filed Jul. 25, 2014 (Ellis); 26 pages.
U.S. Appl. No. 13/852,097 for a System and Method for Capturing and Preserving Vehicle Event Data, filed Mar. 28, 2013 (Barker et al.); 20 pages.
U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.

(56) References Cited

OTHER PUBLICATIONS

U.S. Appl. No. 13/902,242 for a System for Providing a Continuous Communication Link With a Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/370,267 for Industrial Design for Consumer Device Based Scanning and Mobility, filed Jul. 2, 2014 (Ma et al.); 45 pages.
U.S. Appl. No. 14/336,188 for Method of and System for Detecting Object Weighing Interferences, Filed Jul. 21, 2014 (Amundsen et al.); 34 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via Nfc Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/462,801 for Mobile Computing Device With Data Cognition Software, filed on Aug. 19, 2014 (Todeschini et al.); 38 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/277,337 for Multipurpose Optical Reader, filed May 14, 2014 (Jovanovski et al.); 59 pages.
U.S. Appl. No. 14/300,276 for Method and System for Considering Information About an Expected Response When Performing Speech Recognition, filed Jun. 10, 2014 (Braho et al.); 31 pages.
U.S. Appl. No. 14/460,829 for Encoded Information Reading Terminal With Wireless Path Selecton Capability, filed Aug. 15, 2014 (Wang et al.); 40 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/460,387 for Apparatus for Displaying Bar Codes From Light Emitting Display Surfaces filed Aug. 15, 2014 (Van Horn et al.); 40 pages.
U.S. Appl. No. 14/310,226 for Autofocusing Optical Imaging Device filed Jun. 20, 2014 (Koziol et al.); 28 pages.
U.S. Appl. No. 14/305,153 for Indicia Reading System Employing Digital Gain Control filed Jun. 16, 2014 (Xian et al.); 53 pages.
U.S. Appl. No. 14/327,722 for Customer Facing Imaging Systems and Methods for Obtaining Images filed Jul. 10, 2014 (Oberpriller et al,); 39 pages.
U.S. Appl. No. 14/329,303 for Cell Phone Reading Mode Using Image Timer filed Jul. 11, 2014 (Coyle); 22 pages.
U.S. Appl. No. 14/370,237 for Web-Based Scan-Task Enabled System and Method of and Apparatus for Developing and Deploying the Same on a Client-Server Network filed Jul. 2, 2014 (Chen et al.); 65 pages.
U.S. Appl. No. 14/333,588 for Symbol Reading System With Integrated Scale Base filed Jul. 17, 2014 (Barten); 59 pages.
U.S. Appl. No. 14/446,387 for Indicia Reading Terminal Processing Plurality of Frames.
U.S. Appl. No. 14/446,391 for Multifunction Point of Sale Apparatus With Optical Signature Capture filed Jul. 30, 2014 (Good et al.); 37 pages.
Peter Clarke, Actuator Developer Claims Anti-Shake Breakthrough for Smartphone Cams, Electronic Engineering Times, p. 24, May 16, 2011.
U.S. Appl. No. 14/055,234, not yet published, Hand Held Products, Inc. filed Oct. 16, 2013; 26 pages.
U.S. Appl. No. 13/912,262, not yet published, filed Jun. 7, 2013, Hand Held Products Inc., Method of Error Correction for 3D Imaging Device: 33 pages.
European Search Report for application No. EP13186043 (now EP2722656 (Apr. 23, 2014)): Total pp. 7.
International Search Report for PCT/US2013/039438 (WO2013166368), Oct. 1, 2013, 7 pages.
U.S. Appl. No. 14/453,019, not yet published, filed Aug. 6, 2014, Hand Held Products Inc., Dimensioning System With Guided Alignment: 31 pages.
European Office Action for application EP 13186043, dated Jun. 12, 2014(now EP2722656 (Apr. 23, 2014)), Total of 6 pages.
U.S. Appl. No. 14/461,524, not yet published, filed Aug. 18, 2014, Hand Held Products Inc., System and Method for Package Dimensioning: 21 pages.
European Patent Office Action for Application No. 14157971.4-1906, Dated Jul. 16, 2014, 5 pages.
European Patent Search Report for Application No. 14157971.4-1906, Dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; Rose 2008 IEEE International Workshop on Robotic and Sensors Environments (Oct. 17-18, 2008), 6 pages.

(56) References Cited

OTHER PUBLICATIONS

Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Second Chinese Office Action in related CN Application No. 201520810685.6, Dated Mar. 22, 2016, 5 pages.
European Search Report in related EP Application No. 15190315.0, Dated Apr. 1, 2016, 7 pages.
Second Chinese Office Action in related CN Application No. 2015220810562.2, Dated Mar. 22, 2016, 5 pages. English Translation provided.
European Search Report for related Application EP 151902491, Dated Mar. 22, 2016, 7 pages.
Second Chinese Office Action in related CN Application No. 201520810313.3, Dated Mar. 22, 2016, 5 pages. English Translation provided.
European Search Report for Related EP Application No. 15189214.8, dated Mar. 3, 2016, 9 pages.
European Search Report for related EP Application No. 15188440.0, Dated Mar. 8, 2016, 8 pages.
Search Report and Opinion in related GB Application No. 1517112.7, Dated Feb. 19, 2016, 6 Pages (GB2503978 is a commonly owned now abandoned application).
U.S. Appl. No. 14/800,757, Eric Todeschini, filed Jul. 16, 2015, not published yet, Dimensioning and Maging Items, 80 pages.
Proesmans, Marc et al. "Active Acquisition of 3D Shape for Moving Objects" 0-7803-3258-X/96 1996 IEEE; 4 pages.
U.S. Appl. No. 14/747,197, Serge Thuries et al., filed Jun. 23, 2015, not published yet, Optical Pattern Projector; 33 pages.
U.S. Appl. No. 14/747,490, Brian L. Jovanovski et al., filed Jun. 23, 2015, not published yet, Dual-Projector Three-Dimensional Scanner; 40 pages.
U.S. Appl. No. 14/715,916, H. Sprague Ackley, filed May 19, 2015, not published yet, Evaluating Image Values; 54 pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating a Volume Dimensioner; 63 pages.
U.S. Appl. No. 14/801,023, Tyler Doomenbal et al., filed Jul. 16, 2015, not published yet, Adjusting Dimensioning Results Using Augmented Reality, 39 pages.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG "10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.

Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Spiller, Jonathan; Object Localization Using Deformable Templates, Master's Dissertation, University of the Witwatersrand, Johannesburg, South Africa, 2007; 74 pages.
EP Search and Written Opinion Report in related matter EP Application No. 14181437.6, Dated Mar. 26, 2015, 7 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
James Chamberlin, "System and Method for Picking Validation", U.S. Appl. No. 14/865,797, filed Sep. 25, 2015, 44 pages, not yet published.
Jovanovski et al., "Image-Stitching for Dimensioning", U.S. Appl. No. 14/870,488, filed Sep. 30, 2015, 45 pages, not yet published.
Todeschini et al.; "Depth Sensor Based Auto-Focus System for an Indicia Scanner," U.S. Appl. No. 141872,176, filed Oct. 1, 2015, 44 pages, not yet published.
Wikipedia, "3D projection" Downloaded on Nov. 25, 2015 from www.wikipedia.com, 4 pages.
McCloskey et al., "Methods for Improving the Accuracy of Dimensioning-System Measurements," U.S. Appl. No. 14/873,613, filed Sep. 2, 2015, 47 pages, not yet published.
Search Report in counterpart European Application No. 15182675.7, Dated Dec. 4, 2015, 10 pages.
McCloskey et al., "Image Transformation for Indicia Reading," U.S. Appl. No. 14/982,032, filed Oct. 30, 2015, 48 pages, not yet published.
Search Report and Opinion in Related EP Application 15176943.7, Dated Jan. 8, 2016, 7 pages.
Lloyd, Ryan and Scott McCloskey, "Recognition of 3D Package Shapes for Singe Camera Metrology" IEEE Winter conference on Applications of computer Visiona, IEEE, Mar. 24, 2014, pp. 99-106, {retrieved on Jun. 16, 2014}, Authors are employees of common Applicant.
Extended European Search Report in counterpart European Application No. 15182675.7 dated Dec. 4, 2015, pp. 1-10.
Great Britain Search Report for related Application on. GB1517843.7, Dated Feb. 23, 2016; 8 pages.
European Search Report for related EP Application No. 16152477.2, dated May 24, 2016, 8 pages [New Reference cited herein; Reference DE102007037282 A1 and its US Counterparts have been previously cited.].
European Partial Search Report for related EP Application No. 15190306.9, dated May 6, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].
M. Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.

(56) References Cited

OTHER PUBLICATIONS

Second Chinese Office Action in related CN Application No. 201520810313.3, Dated Mar. 22, 2016, 5 pages. English Translation provided [No references].
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1,1993, 15 pages.
El-Hakim et al., "A Knowledge-based Edge/Object Measurement Technique", Retrieved from the Internet: URL: https://www.researchgate.net/profile/Sabry_El -Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
United Kingdom Search Report in related application GB1517842.9, dated Apr. 8, 2016, 8 pages.
European Extended search report in related EP Application No. 15190306.9, Dated Sep. 9, 2016, 15 pages (only new references are cited; remaining references were cited with partial search report in same application dated May 6, 2016).
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
United Kingdom combined Search and Examination Report in related GB Application No. 1607394.2, Dated Oct. 19, 2016, 7 pages.
European Extended Search Report in Related EP Application No. 16172995.9, Dated Aug. 22, 2016, 11 pages (Only new references have been cited; U.S. Pat. No. 8,463,079 (formerly U.S. Publication 2010/0220894) and U.S. Publication 2001/0027955 have been previously cited.).
European Search Report from related EP Application No. 16168216.6, Dated Oct. 20, 2016, 8 pages [New reference cited above; U.S. Publication 2014/0104413 has been previously cited].
European Extended Search Report in related EP Application No. 16173429.8, dated Dec. 1, 2016, 8 pages [Only new references cited: US 2013/0038881 was previously cited].
Extended European Search Report in related EP Application No. 16175410.0, dated Dec. 13, 2016, 5 pages.
Padzensky, Ron; "Augmera; Gesture Control", Dated Apr. 18, 2015, 15 pages.
Grabowski, Ralph; "New Commands in AutoCADS 2010: Part 11 Smoothing 3D Mesh Objects" Dated 2011 (per examiner who cited reference), 6 pages.
Theodoropoulos, Gabriel; "Using Gesture Recognizers to Handle Pinch, Rotate, Pan, Swipe, and Tap Gestures" dated Aug. 25, 2014, 34 pages.
Wikipedia, "Microlens", Downloaded from https://en.wikipedia.org/wiki/Microlens, pp. 3.
Fukaya et al., "Characteristics of Speckle Random Pattern and Its Applications", pp. 317-327, Nouv. Rev. Optique, t.6, n.6. (1975).
European extended search report in related EP Application 16190833.0, dated Mar. 9, 2017, 8 pages [only new art has been cited; US Publication 2014/0034731 was previously cited].
United Kingdom Combined Search and Examination Report in related Application No. GB1620676.5, dated Mar. 8, 2017, 6 pages [References have been previosly cited; WO2014/151746, WO2012/1175731, US2014/0313527, GB2503978].
European Exam Report in related EP Application No. 16168216.6, dated Feb. 27, 2017, 5 pages, [References have been previously cited;WO2011/017241 and US 2014/0104413].
Chinese Notive of Re-examination in related CN Application No. 201520810313.3, dated Mar. 14, 2017, 7 pages, [Translation provided; no new references].
Thorslab, Examiner Cited NPL in Advisory Action dated Apr. 12, 2017 in related commonly owned application, downloaded from https://www.thorlabs.com/newgrouppage9.cfm?objectgroup_id=6430, 4 pages.
EKSMA Optics, Examiner Cited NPL in Advisory Action dated Apr. 13, 2017 in related commonly owned application, downloaded from http://eksmaoptics.com/optical-systems/f-theta-lenses/f-theta-lens-for-1064-nm/, 2 pages.
Sill Optics, Examiner Cited NPL in Advisory Action dated Apr. 12, 2017 in related commonly owned application, http://www.silloptics.de/1/products/sill-encyclopedia/laser-optics/f-theta-lenses/, 4 pages.
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited In EP Extended search report dated Apr. 10, 2017].
European Written Exam in related EP Application 1516943.7, dated Apr. 12, 2017, 6 pages [Art has been previously cited in this matter].
European Written Exam in related EP Application 15188440.0, dated Apr. 21, 2017, 6 pages [No new Art].
Ralph Grabowski, "Smothing 3D Mesh Objects," New Commands in AutoCAD 2010: Part 11, Examiner Cited art in related matter Non Final Office Action dated May 19, 2017; 6 pages.
EP Search Report in Related EP Application No. 17171844 dated Sep. 18, 2017. 4 pages.
European Search Report in related EP Application No. 17175357.7, dated Aug. 17, 2017, pp. 1-7.
Boavida et al., "Dam monitoring using combined terrestrial imaging systems", 2009 Civil Engineering Survey De/Jan. 2009, pp. 33-38.

\* cited by examiner

DIMENSIONING SYSTEM WITH GUIDED ALIGNMENT

FIELD OF THE INVENTION

The present invention relates to the field of dimensioning systems, and more specifically, to a system and method for aligning a package dimensioning system.

BACKGROUND

Generally speaking freight carriers calculate shipping costs based on package size and weight (i.e., volumetric weight). This helps prevent lightweight packages that require a large amount of space from becoming unprofitable for the freight carriers.

When printing a shipping label for a package, a freight carrier employee is required to enter the package's size and weight into a software application that uses this information to calculate the cost of shipping. Typically, freight carrier employees derive this information through hand measurements (e.g., with a tape measure) and may weigh the package on a scale. Hand measurements are prone to error, particularly when packages have an irregular shape. These errors may lead to dissatisfaction and/or financial loss. For example, when a shipping company determines, after shipping costs are negotiated, that a package is larger and/or heavier than reported by the customer, additional costs may assessed. In addition, retailers that pass the shipping costs along to customers typically assume the extra shipping costs associated with these errors. As a result, automated dimensioning systems have been developed to bring more accuracy to package volume calculation.

One such automated dimensioning system uses a light projector to project a light pattern (e.g., point cloud) onto objects (e.g., packages) within a field of view. A range camera, physically offset from the light projector, creates a range image from the light pattern reflected from the packages. Software running on a computing device compares the light pattern in the range image to some reference (e.g., a reference image taken during calibration). Through this comparison, the dimensions of a package may be derived.

In order to dimension a specified size range (e.g., a range of package sizes) accurately, the dimensioning system may require a user to position (i.e., align) the range sensor into a particular pose (i.e., height and orientation). This positioning typically takes place during the installation of the dimensioning system. During positioning the pose is computed relative to a reference (i.e., ground) plane that is typically defined prior to positioning. The process of selecting the reference plane and positioning the range sensor is not easily handled by a typical user, but poorly installed range sensors may result in dimensioning errors or the inability to dimension. Therefore, a need exists for a method to assist the user with the selection of a reference plane and the positioning of a range sensor to ensure good performance of the dimensioning system.

SUMMARY

Accordingly, in one aspect, the present invention embraces a package dimensioning system including a range sensor for capturing a series of range images of the range sensor's field of view. The system also includes an adjustable range-sensor support to physically support and position the range sensor in a target pose. A computing device, communicatively coupled to the range sensor, is capable of executing an adjustment software program, which provides adjustment messages to facilitate the adjustment of the range sensor. The adjustment software program configures the computing device to receive the series of range images, process the series of range images to produce the adjustment messages, and transmit the adjustment messages to a display. The display is communicatively coupled to the computing device and displays the series of range images and the adjustment messages.

In another aspect, the present invention embraces a computer implemented method for generating adjustment messages to facilitate the positioning of a range sensor for dimensioning. The method includes the step of recording range images onto a computer-readable storage medium. The method also includes the step of reading the range images from the computer-readable storage medium. In addition, the method includes processing the range images to derive a result. The method further includes the step of generating adjustment messages based on the result.

The foregoing illustrative summary, as well as other exemplary objectives and/or advantages of the invention, and the manner in which the same are accomplished, are further explained within the following detailed description and its accompanying figure (i.e., fig.) set.

DETAILED DESCRIPTION

Figure 1:
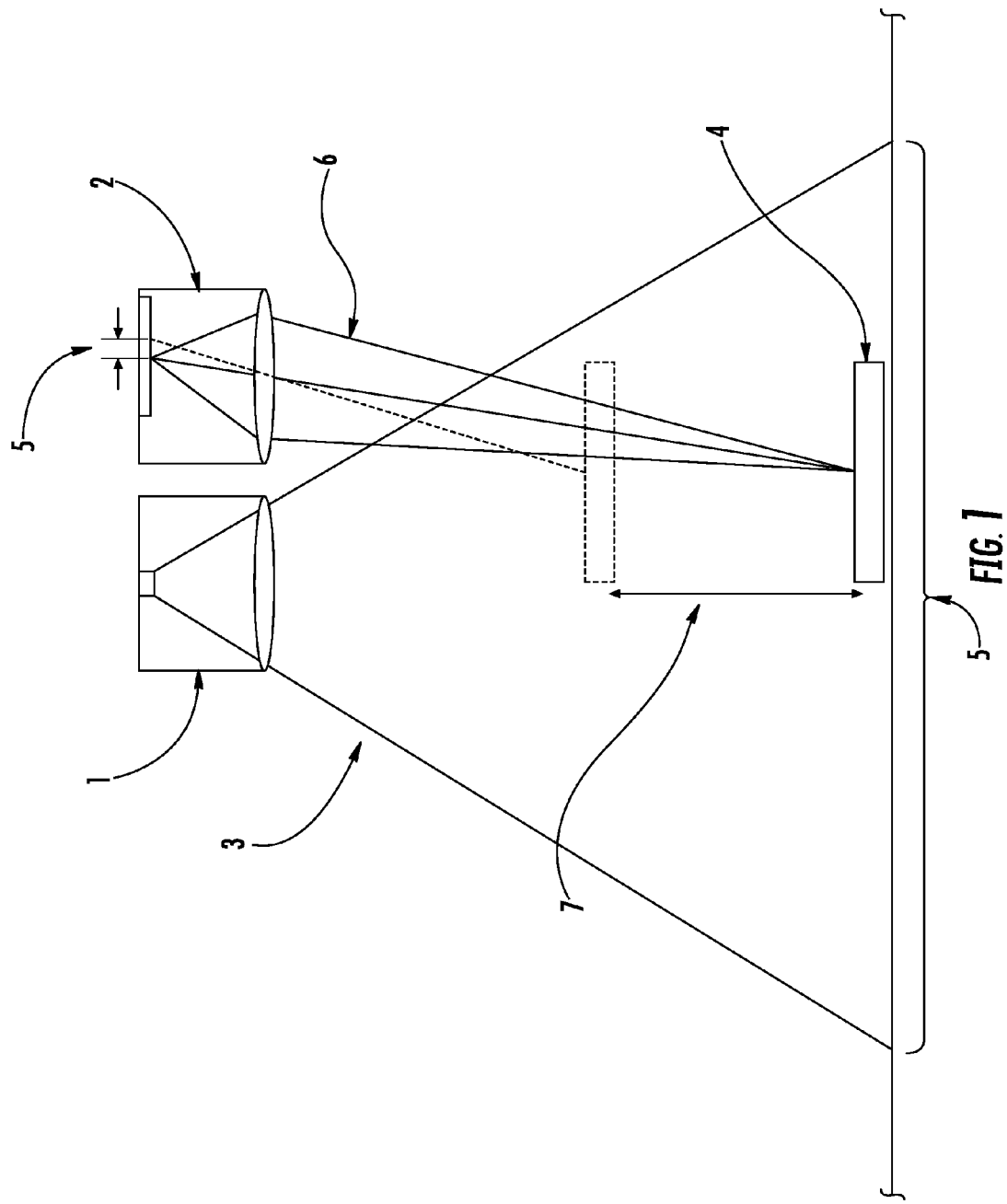
FIG. 1 schematically depicts an exemplary range sensor's stereo arrangement of a pattern projector of a range camera for capturing range information as a pixel displacement.

The present invention embraces a dimensioning system to measure items, such as packages for shipment. The dimensioning system typically uses a range sensor, a computing device, and a display for this measurement. The range sensor may be an optical system that acquires information about a field of view or could use another range sensing modality (e.g., ultrasonic). The optical system requires a user to place an item within the system's field of view for measurement and is very easy to use. For the system to give best results, however, the range sensor should be positioned in a range-sensor pose with respect to a frame of reference shared by the package that closely matches a target pose (e.g., below an adjustable threshold value of pose difference). The target pose represents the desired range sensor's position (e.g., height, pitch, roll, and/or yaw) with respect to the frame of reference that ensures good dimensioning performance. The target pose is chosen to allow the range sensor to obtain accurate dimensioning results for a given range of package sizes. For example, a target pose may be established to contain the largest package to be dimensioned, while also ensuring that the smallest package may be resolved sufficiently for accurate measurement. The target pose is also chosen based on the range sensor's resolution, field of view, and/or other limitations (e.g., specular reflections, multipath interference, and/or mixed pixel responses). Similarly, a target pose may be chosen to minimize depth differences between a foreground package and clutter (e.g., background clutter). The target pose may be stored on a computer-readable medium (e.g., non-transitory memory) communicatively coupled to the computing device and is typically set once for a particular application. In certain scenarios, however, this target pose could adjustable. For example, an old target pose could be replaced with a new target pose, or in another embodiment, target poses could be selected by a user to match a particular dimensioning application. For example, a user might want to replace the range sensor with a new range sensor that has a different, sensing modality, resolution, and/or field of view. Here the user could update the target pose to match the new range sensor. Alternatively, the user might want to accommodate a new range of package sizes. Here the user could update the target pose to meet the requirements of the new range of package sizes.

The mathematical representation of a physical pose requires a frame of reference. This frame of reference may be defined with a specified surface (e.g., planar surface) or a line. Alternatively, the frame of reference may be established with a set of 3D points that are arranged in some known way. For example, a pose may be calculated relative to a cylinder placed in front of the camera. Typically, however, a planar surface within the field of view, selected by a user, establishes the frame of reference. For example, the surface that the measured item (e.g., package) rests on during the measurement (e.g., scale or counter-top) may be chosen to serve as the reference surface (i.e., platform). In this way, the orientations of the range-sensor pose and the target pose (each relative to the frame of reference) can be derived mathematically and compared (e.g., compared by rotation matrix or axis-angle representation). For example, rotation vectors, with respect to the frame of reference, could be derived for each pose using Rodrigues' rotation formula. The angle between the two rotation vectors could then be computed and compared to obtain the difference between the range-sensor pose and the target pose (i.e., pose difference).

The process of establishing the platform and aligning the range-sensor pose with a target pose may be made easier through the use of software (e.g., one or more executable files, libraries, and/or scripts) to generate guidance advice for sensor alignment. Here, the adjustment software (i.e., adjustment software program) receives range images from the range sensor and produces feedback (i.e., adjustment messages) to help a user align the range sensor.

Range images are typically single-channel (e.g., gray scale) images that represent the distance between the range camera and the portion of the field of view represented by a pixel. Using these range images, the adjustment software may detect planar surfaces using an algorithm. For example, a random sample consensus (i.e., RANSAC) algorithm may identify planar surfaces within the range sensor's field of view. In the case where more than one planar surface is detected within the range camera's field of view, each planar surface may be indicated in a visual image presented on a display. In one possible embodiment, each planar surface may be indicated by an overlay (e.g., semi-transparent and/or colored overlay) image superimposed on the range image and presented on the display. In other possible embodiments, the reference surface may otherwise highlighted (e.g., an outline). A prompt, generated by the adjustment software, may query a user to indicate which planar surface should be established as the reference surface (i.e., ground plane). Once the ground plane (i.e., platform) is established, the adjustment software may use the range image to compute the range camera's height and orientation (i.e., roll, pitch, and/or yaw) with respect to the ground plane.

During range sensor alignment (e.g., during installation of a package dimensioning system) the adjustment software may use the computed range sensor height and orientation to provide adjustment messages. These adjustment messages include indications of the necessary adjustments in order to align the range sensor's physical pose with the target pose. This feedback may be audible or visual. Visible messages could be text messages or graphical images displayed alone, in addition to, and/or superimposed on other images (e.g., range images, color images, or point-cloud images). By following these adjustment messages, a user may adjust the range-sensor support (e.g., adjustable tripod mount, pole mount, ceiling mount, and/or wall mount) to move the range sensor closer to the target pose. Many adjustment messages may be generated during the alignment process. In one possible embodiment, the process of analyzing range images and providing alignment messages (e.g., "move camera up") may continue iteratively until the range sensor is aligned with the target pose. Once aligned, the adjustment software may provide an adjustment message indicating that the range sensor is in position, indicating that the user should stop adjusting and secure the support. In another possible embodiment, the software may provide alignment messages that indicate the alignment of the range-sensor pose with the target pose in qualitative terms (e.g., good, better, or best). In still another possible embodiment, the software may simply provide real-time alignment information (e.g., pose difference results in numerical form) and allow the user to decide the ultimate alignment criteria.

While the adjustment software is typically used during the installation of the package dimensioning system, it may also be used periodically after the installation. For example, the adjustment software program may be configured to periodically check the range sensor's pose and compare this with the target pose. If the difference between the two poses (i.e., pose difference) is above some threshold value (e.g., from a misalignment caused by mechanical movement or vibration), the guidance software may provide messages to alert a user that the range sensor is no longer in alignment and that an adjustment is necessary.

The alignment process may happen in real-time with the display rendering real-time range images, while simultaneously displaying adjustment messages. In one embodiment, for example, the adjustment software may guide the user to first adjust range sensor's height and then adjust its orientation (i.e., roll, pitch, and/or yaw) separately and sequentially. In another embodiment, the software may accommodate a user to jointly adjust the range sensor's height and orientation simultaneously.

Three-dimensional (i.e., 3D) sensors (e.g., range sensors) can be utilized effectively in dimensioning applications. The recent advent of relatively low-cost range sensors that can detect and display three-dimensional information has afforded greater opportunity for implementing automated dimensioning on a wider scale. Consequently, the package-dimensioning system disclosed here may include a range sensor to acquire a two-dimensional gray scale image for conveying the range on a pixel by pixel basis (i.e., range image). In an exemplary range image, darker pixels may indicate a point that is a shorter distance away from the range sensor than points represented by lighter pixels.

In the embodiment shown in FIG. 1, the range sensor includes a projector 1 and a range camera 2. The projector 1 may radiate a light pattern onto an item 4 within a field of view 3. The reflected light pattern 6 from the item may be imaged and detected by the range camera 2. If the item's range 7 is changed then the range camera may sense this change as a displacement 5 in detected light pattern. A processor within the range sensor may convert this range information into a range image. In this way the pattern projector and range camera may together help to produce a range image. The projector 1 and the range camera 2 are positioned collinearly and are codirected towards the same field of view (i.e., are positioned in a stereo arrangement). The light from the projector (e.g., the point cloud) may be visible but is typically invisible to the human eye. The range camera is sensitive to this light. In some embodiments, the range sensor also includes a color (i.e., RGB) camera that is sensitive to visible light and which shares the field of view 3 with the projector and range camera. This color camera may be used to display images for a user that are easily interpreted and less confusing than the gray scale range images or point cloud images. In another possible embodiment, the range images may be displayed during the alignment process. In yet another possible embodiment, the raw images including the projected light pattern (point cloud images) may be displayed during the alignment process.

Figure 2:
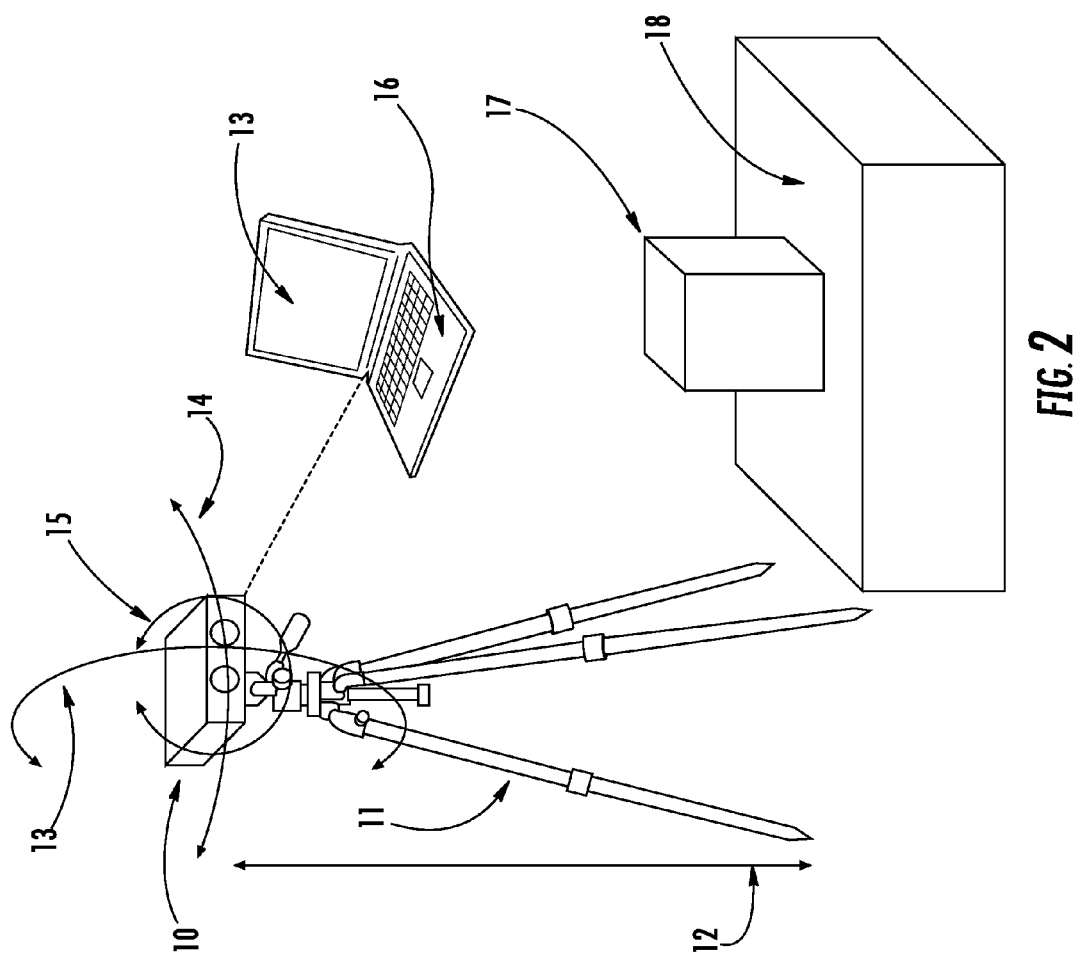
FIG. 2 graphically depicts an exemplary dimensioning system including a platform and an object for dimensioning.

An exemplary package dimensioning system is graphically shown in FIG. 2. Here the range sensor 10 is physically supported and positioned by the range-sensor support 11. The support helps configure the range-sensor pose which is defined by the range sensor's height 12 and orientation. The orientation may include the range sensor's pitch 13, yaw 14, and/or roll 15. A user may configure the range-sensor pose to match a target pose through the use of an adjustable range-sensor support 11. This support is shown in this embodiment as a tripod, though other support mechanisms (e.g., pole-mount, wall-mount, or ceiling-mount) may be used. An adjustment software program executed by a computing device 16 may display adjustment message on a display 13. The range-sensor pose and the target pose are relative to a platform 18 (i.e., reference plane or ground plane) that a package 17 is placed on for dimensioning. The platform may be selected by a user from a plurality of planar surfaces detected within the field of view before the poses are calculated.

Figure 3:
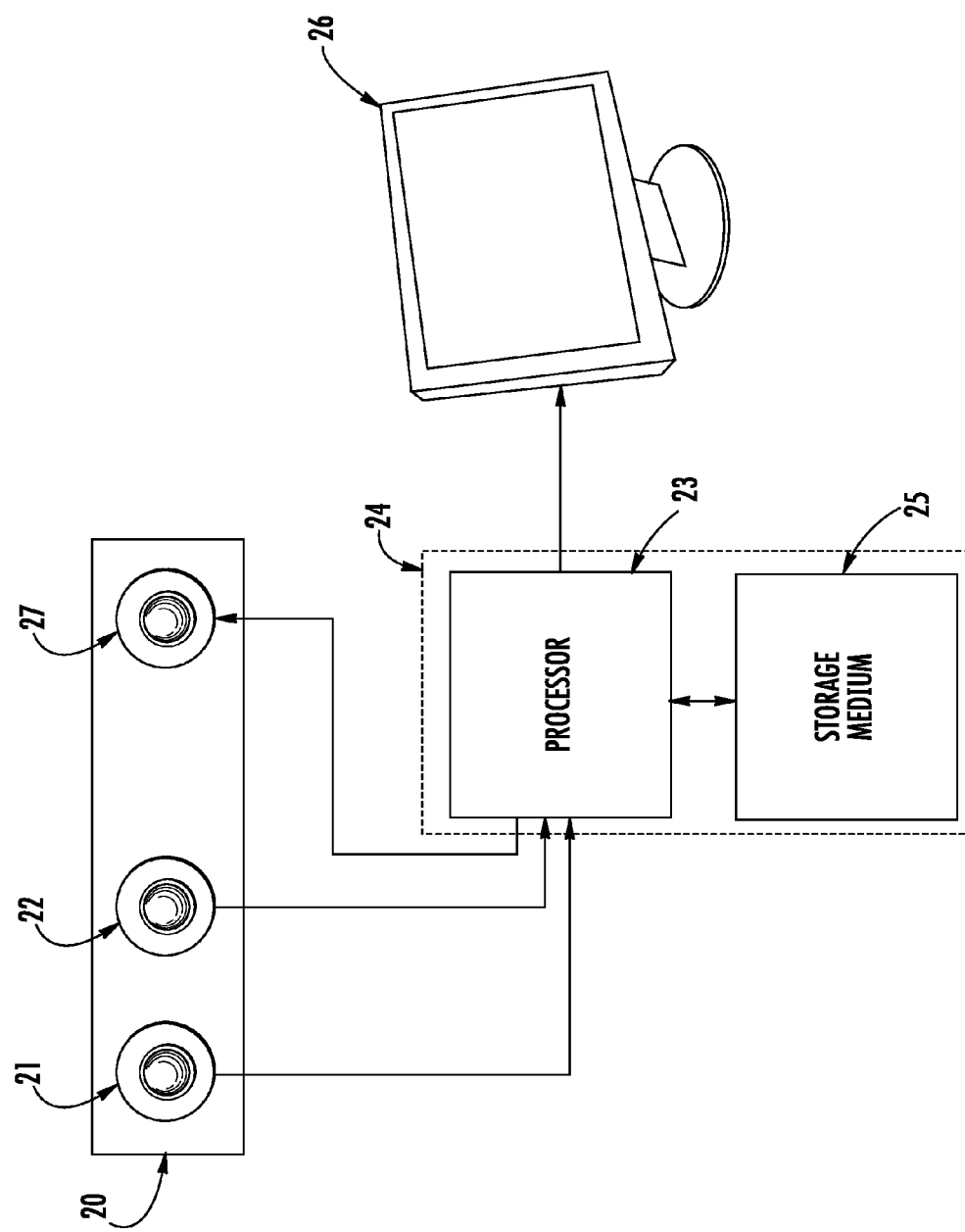
FIG. 3 schematically depicts an exemplary dimensioning system.

The schematic of the package dimensioning system including a computing device 24 for package dimensioning is shown in FIG. 3. Here a range sensor 20 includes a pattern projector 27 for creating a light pattern that can be imaged by the range camera 22 and mathematically transformed into a range image that is transmitted from the range sensor 20 to a processor 23 integrated in the computing device 24 and communicatively coupled to the range sensor. The processor may store the range image in a computer-readable storage medium 25. Adjustment software stored in the storage medium 25 may configure the processor 23 to execute the program steps required for generating the adjustment messages necessary to facilitate the positioning of the range sensor 20 for dimensioning. The processor may transmit the adjustment messages to a display 26. These messages may be displayed along with an image of the range sensor's field of view. This image of the field of view may be the range camera's 22 image or may be a color image created by a color camera 21 configured with the same field of view as the range camera 22. The color camera is optional but may enhance the user's experience, as these images may be easier to understand than the gray scale range images.

Figure 4:
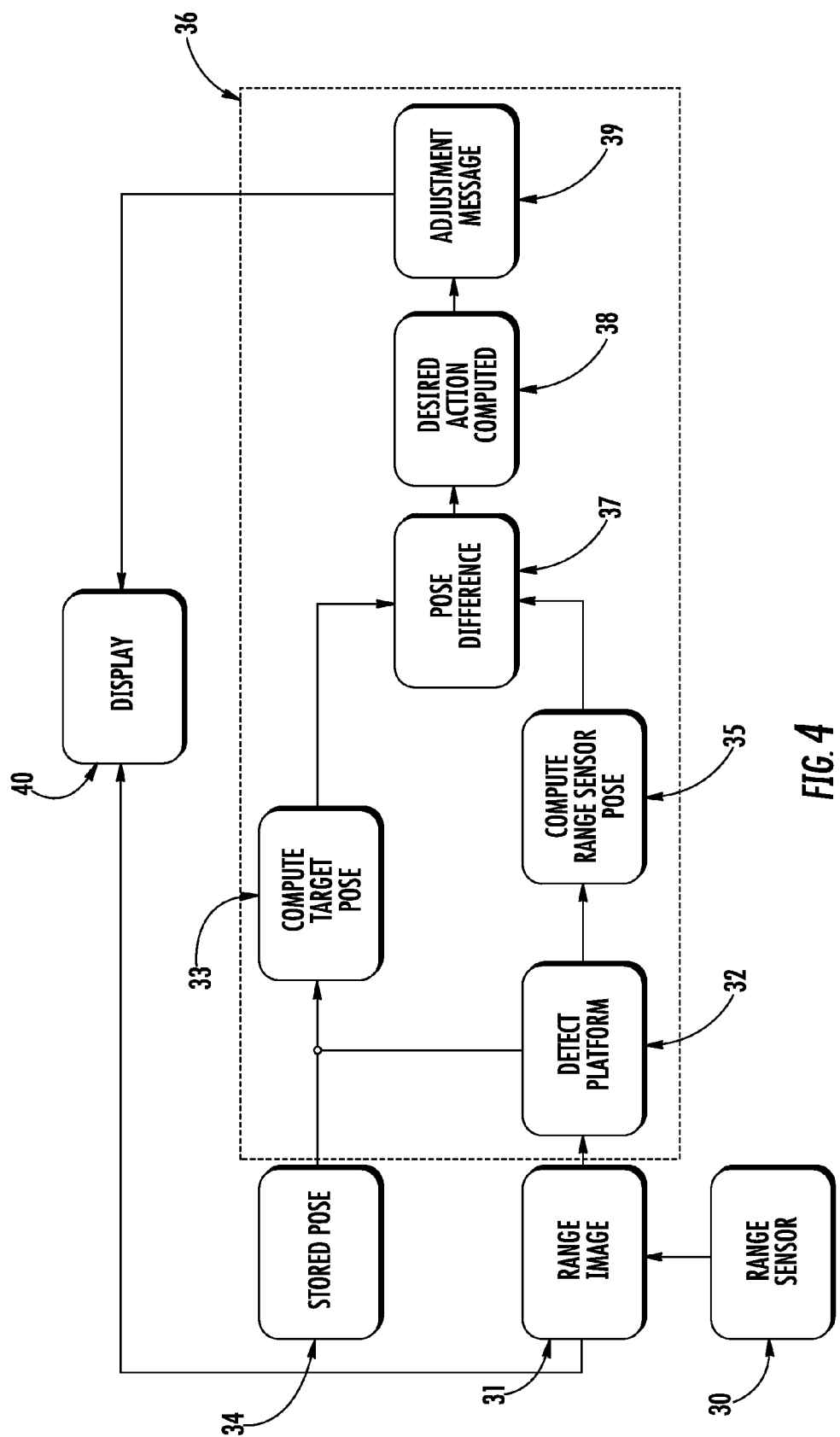
FIG. 4 schematically depicts a flowchart of an exemplary adjustment software program.

As shown in FIG. 4, the adjustment software program 36 operates on range information (e.g., range images 31) to produce some feedback information (e.g., adjustment messages 39). A flowchart illustrating the method for generating adjustment messages to facilitate the positioning of a range sensor for package dimensioning is shown in FIG. 4. The range sensor 30 produces a range image 31. The software analyzes the range image to detect planar surfaces within the field of view. A user may then be prompted to select a reference plane (i.e., platform) from the detected planar surfaces. Alternatively, the software may detect and select a platform automatically. Once the platform 32 is detected, a target pose 33 may be computed based on a stored pose 34. The stored pose information may be information based on the range camera's field of view, the range of expected package sizes, and/or the resolution of the range image. This information may be stored in the computing device's non-transitory, computer-readable storage medium (e.g., hard drive). The platform 32 may also be used to mathematically compute the range-sensor pose 35 from the range image 31 and the platform 32. Mathematically a pose may be defined as a vector relative to the platform 32. The adjustment software program 36 then computes the difference between the target pose 33 and the range-sensor pose 35 to determine a pose difference 37 (e.g., vector difference). If the pose difference is zero (or below some threshold value) then the camera is considered aligned, however if the pose difference is above a threshold value, then a desired action 38 to minimize the pose difference is computed. Based on the desired action 38, an adjustment message 39 is created. This adjustment message is then transmitted with the range camera's image to the display 40 for viewing. The adjustment message could be a text message or a graphical image. In one possible embodiment an arrow graphic indicating the direction to move the range sensor 30 could be overlaid with the range image 31 on the display 40. In another embodiment the adjustment message could provide quantitative measurements (e.g., move camera up 10 cm). In another possible embodiment the adjustment messages may be audio messages transmitted to a speaker for broadcast.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;

U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
International Publication No. 2013/163789;
International Publication No. 2013/173985;
International Publication No. 2014/019130;
U.S. patent application Publication No. 2008/0185432;
U.S. patent application Publication No. 2009/0134221;
U.S. patent application Publication No. 2010/0177080;
U.S. patent application Publication No. 2010/0177076;
U.S. patent application Publication No. 2010/0177707;
U.S. patent application Publication No. 2010/0177749;
U.S. patent application Publication No. 2011/0202554;
U.S. patent application Publication No. 2012/0111946;
U.S. patent application Publication No. 2012/0138685;
U.S. patent application Publication No. 2012/0168511;
U.S. patent application Publication No. 2012/0168512;
U.S. patent application Publication No. 2012/0193407;
U.S. patent application Publication No. 2012/0193423;
U.S. patent application Publication No. 2012/0203647;
U.S. patent application Publication No. 2012/0223141;
U.S. patent application Publication No. 2012/0228382;
U.S. patent application Publication No. 2012/0248188;
U.S. patent application Publication No. 2013/0043312;
U.S. patent application Publication No. 2013/0056285;
U.S. patent application Publication No. 2013/0070322;
U.S. patent application Publication No. 2013/0075168;
U.S. patent application Publication No. 2013/0082104;
U.S. patent application Publication No. 2013/0175341;
U.S. patent application Publication No. 2013/0175343;
U.S. patent application Publication No. 2013/0200158;
U.S. patent application Publication No. 2013/0214048;
U.S. patent application Publication No. 2013/0256418;
U.S. patent application Publication No. 2013/0257744;
U.S. patent application Publication No. 2013/0257759;
U.S. patent application Publication No. 2013/0270346;
U.S. patent application Publication No. 2013/0278425;
U.S. patent application Publication No. 2013/0287258;
U.S. patent application Publication No. 2013/0292474;
U.S. patent application Publication No. 2013/0292475;
U.S. patent application Publication No. 2013/0292477;
U.S. patent application Publication No. 2013/0293539;
U.S. patent application Publication No. 2013/0293540;
U.S. patent application Publication No. 2013/0306728;
U.S. patent application Publication No. 2013/0306730;
U.S. patent application Publication No. 2013/0306731;
U.S. patent application Publication No. 2013/0306734;
U.S. patent application Publication No. 2013/0307964;
U.S. patent application Publication No. 2013/0308625;
U.S. patent application Publication No. 2013/0313324;
U.S. patent application Publication No. 2013/0313325;
U.S. patent application Publication No. 2013/0313326;
U.S. patent application Publication No. 2013/0327834;
U.S. patent application Publication No. 2013/0341399;
U.S. patent application Publication No. 2013/0342717;
U.S. patent application Publication No. 2014/0001267;
U.S. patent application Publication No. 2014/0002828;
U.S. patent application Publication No. 2014/0008430;
U.S. patent application Publication No. 2014/0008439;
U.S. patent application Publication No. 2014/0021256;
U.S. patent application Publication No. 2014/0025584;
U.S. patent application Publication No. 2014/0027518;
U.S. patent application Publication No. 2014/0034723;
U.S. patent application Publication No. 2014/0034734;
U.S. patent application Publication No. 2014/0036848;
U.S. patent application Publication No. 2014/0039693;
U.S. patent application Publication No. 2014/0042814;
U.S. patent application Publication No. 2014/0049120;
U.S. patent application Publication No. 2014/0049635;
U.S. patent application Publication No. 2014/0061305;
U.S. patent application Publication No. 2014/0061306;
U.S. patent application Publication No. 2014/0061307;
U.S. patent application Publication No. 2014/0063289;
U.S. patent application Publication No. 2014/0066136;
U.S. patent application Publication No. 2014/0067692;
U.S. patent application Publication No. 2014/0070005;
U.S. patent application Publication No. 2014/0071840;
U.S. patent application Publication No. 2014/0074746;
U.S. patent application Publication No. 2014/0075846;
U.S. patent application Publication No. 2014/0076974;
U.S. patent application Publication No. 2014/0078341;
U.S. patent application Publication No. 2014/0078342;
U.S. patent application Publication No. 2014/0078345;
U.S. patent application Publication No. 2014/0084068;
U.S. patent application Publication No. 2014/0086348;
U.S. patent application Publication No. 2014/0097249;
U.S. patent application Publication No. 2014/0098284;
U.S. patent application Publication No. 2014/0098792;
U.S. patent application Publication No. 2014/0100774;
U.S. patent application Publication No. 2014/0100813;
U.S. patent application Publication No. 2014/0103115;
U.S. patent application Publication No. 2014/0104413;
U.S. patent application Publication No. 2014/0104414;
U.S. patent application Publication No. 2014/0104416;
U.S. patent application Publication No. 2014/0104451;
U.S. patent application Publication No. 2014/0106594;
U.S. patent application Publication No. 2014/0106725;
U.S. patent application Publication No. 2014/0108010;
U.S. patent application Publication No. 2014/0108402;
U.S. patent application Publication No. 2014/0108682;
U.S. patent application Publication No. 2014/0110485;
U.S. patent application Publication No. 2014/0114530;
U.S. patent application Publication No. 2014/0124577;
U.S. patent application Publication No. 2014/0124579;
U.S. patent application Publication No. 2014/0125842;
U.S. patent application Publication No. 2014/0125853;
U.S. patent application Publication No. 2014/0125999;
U.S. patent application Publication No. 2014/0129378;

U.S. patent application Ser. No. 13/367,978 for a Laser Scanning Module Employing An Elastomeric U-Hinge Based Laser Scanning Assembly, filed Feb. 7, 2012 (Feng et al.);

U.S. patent application Ser. No. 29/436,337 for an Electronic Device, filed Nov. 5, 2012 (Fitch et al.);

U.S. patent application Ser. No. 13/736,139 for an Electronic Device Enclosure, filed Jan. 8, 2013 (Chaney);

U.S. patent application Ser. No. 13/771,508 for an Optical Redirection Adapter, filed Feb. 20, 2013 (Anderson);

U.S. patent application Ser. No. 13/780,356 for a Mobile Device Having Object-Identification Interface, filed Feb. 28, 2013 (Samek et al.);

U.S. patent application Ser. No. 13/852,097 for a System and Method for Capturing and Preserving Vehicle Event Data, filed Mar. 28, 2013 (Barker et al.);

U.S. patent application Ser. No. 13/902,110 for a System and Method for Display of Information Using a Vehicle-Mount Computer, filed May 24, 2013 (Hollifield);

U.S. patent application Ser. No. 13/902,144, for a System and Method for Display of Information Using a Vehicle-Mount Computer, filed May 24, 2013 (Chamberlin);

U.S. patent application Ser. No. 13/902,242 for a System For Providing A Continuous Communication Link With A Symbol Reading Device, filed May 24, 2013 (Smith et al.);

U.S. patent application Ser. No. 13/912,262 for a Method of Error Correction for 3D Imaging Device, filed Jun. 7, 2013 (Jovanovski et al.);

U.S. patent application Ser. No. 13/912,702 for a System and Method for Reading Code Symbols at Long Range Using Source Power Control, filed Jun. 7, 2013 (Xian et al.);

U.S. patent application Ser. No. 29/458,405 for an Electronic Device, filed Jun. 19, 2013 (Fitch et al.);

U.S. patent application Ser. No. 13/922,339 for a System and Method for Reading Code Symbols Using a Variable Field of View, filed Jun. 20, 2013 (Xian et al.);

U.S. patent application Ser. No. 13/927,398 for a Code Symbol Reading System Having Adaptive Autofocus, filed Jun. 26, 2013 (Todeschini);

U.S. patent application Ser. No. 13/930,913 for a Mobile Device Having an Improved User Interface for Reading Code Symbols, filed Jun. 28, 2013 (Gelay et al.);

U.S. patent application Ser. No. 29/459,620 for an Electronic Device Enclosure, filed Jul. 2, 2013 (London et al.);

U.S. patent application Ser. No. 29/459,681 for an Electronic Device Enclosure, filed Jul. 2, 2013 (Chaney et al.);

U.S. patent application Ser. No. 13/933,415 for an Electronic Device Case, filed Jul. 2, 2013 (London et al.);

U.S. patent application Ser. No. 29/459,785 for a Scanner and Charging Base, filed Jul. 3, 2013 (Fitch et al.);

U.S. patent application Ser. No. 29/459,823 for a Scanner, filed Jul. 3, 2013 (Zhou et al.);

U.S. patent application Ser. No. 13/947,296 for a System and Method for Selectively Reading Code Symbols, filed Jul. 22, 2013 (Rueblinger et al.);

U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/047,896 for Terminal Having Illumination and Exposure Control filed Oct. 7, 2013 (Jovanovski et al.);

U.S. patent application Ser. No. 14/053,175 for Imaging Apparatus Having Imaging Assembly, filed Oct. 14, 2013 (Barber);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/118,400 for Indicia Decoding Device with Security Lock, filed Nov. 18, 2013 (Liu);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/154,915 for Laser Scanning Module Employing a Laser Scanning Assembly having Elastomeric Wheel Hinges, filed Jan. 14, 2014 (Havens et al.);

U.S. patent application Ser. No. 14/158,126 for Methods and Apparatus to Change a Feature Set on Data Collection Devices, filed Jan. 17, 2014 (Berthiaume et al.);

U.S. patent application Ser. No. 14/159,074 for Wireless Mesh Point Portable Data Terminal, filed Jan. 20, 2014 (Wang et al.);

U.S. patent application Ser. No. 14/159,509 for MMS Text Messaging for Hand Held Indicia Reader, filed Jan. 21, 2014 (Kearney);

U.S. patent application Ser. No. 14/159,603 for Decodable Indicia Reading Terminal with Optical Filter, filed Jan. 21, 2014 (Ding et al.);

U.S. patent application Ser. No. 14/160,645 for Decodable Indicia Reading Terminal with Indicia Analysis Functionality, filed Jan. 22, 2014 (Nahill et al.);

U.S. patent application Ser. No. 14/161,875 for System and Method to Automatically Discriminate Between Different Data Types, filed Jan. 23, 2014 (Wang);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/176,417 for Devices and Methods Employing Dual Target Auto Exposure filed Feb. 10, 2014 (Meier et al.);

U.S. patent application Ser. No. 14/187,485 for Indicia Reading Terminal with Color Frame Processing filed Feb. 24, 2014 (Ren et al.);

U.S. patent application Ser. No. 14/200,405 for Indicia Reader for Size-Limited Applications filed Mar. 7, 2014 (Feng et al.);

U.S. patent application Ser. No. 14/222,994 for Method and Apparatus for Reading Optical Indicia Using a Plurality of Data filed Mar. 24, 2014 (Smith et al.);

U.S. patent application Ser. No. 14/230,322 for Focus Module and Components with Actuator filed Mar. 31, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/249,497 for Terminal Having Plurality of Operating Modes filed Apr. 10, 2014, Grunow et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.)

U.S. patent application Ser. No. 14/257,364 for Docking System and Method Using Near Field Communication filed Apr. 21, 2014, (Showering);

U.S. patent application Ser. No. 14/264,173 for Autofocus Lens System for Indicia Readers filed Apr. 29, 2014, (Ackley et al.);

U.S. patent application Ser. No. 14/274,858 for Mobile Printer with Optional Battery Accessory filed May 12, 2014, (Marty et al.);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/342,551 for Terminal Having Image Data Format Conversion filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 29/486,759 for an Imaging Terminal, filed Apr. 2, 2014 (Oberpriller et al.); and U.S. patent application Ser. No. 14/355,613 for Optical Indicia Reading Terminal with Color Image Sensor filed May 1, 2014, (Lu et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A dimensioning system comprising:
a range sensor for capturing range images of a field of view;
an adjustable range-sensor support to physically support and position the range sensor in a range-sensor pose;
a computing device communicatively coupled to the range sensor, the computing device capable of executing adjustment software and dimensioning software; and
a display communicatively coupled to the computing device;
wherein said adjustment software generates adjustment messages to facilitate adjustment of the range-sensor pose, the adjustment software configuring the computing device to: (i) receive the range images from the range sensor, (ii) compute, using at least one of the range images, a pose difference, wherein the pose difference comprises a difference between an initial range-sensor pose and a target range-sensor pose, (iii) generate, based on the pose difference, at least one adjustment message to facilitate adjustment of the range sensor pose to more closely align with the target range-sensor pose, and (iv) transmit the at least one adjustment message to the display-communicatively coupled to the computing device, and
wherein the dimensioning software configures the computing device to derive, from at least one of the range images, dimensions of an object in the field of view.

2. The dimensioning system according to claim 1, wherein the adjustment software generates adjustment messages until the pose difference is minimized below an adjustable threshold value.

3. The dimensioning system according to claim 1, wherein the range sensor comprises a stereo arrangement of (i) a pattern projector for projecting a light pattern within a field of view and (ii) a range camera for capturing images of the reflected light pattern.

4. The dimensioning system according to claim 1, wherein the light pattern is invisible.

5. The dimensioning system according to claim 1, wherein the range sensor comprises a color camera for capturing color images of visible light within the field of view.

6. The dimensioning system according to claim 1, wherein the adjustment software further configures the computing device to detect planar surfaces in the range images.

7. The dimensioning system according to claim 6, wherein the adjustment messages comprise indications for a user to select a platform from the detected planar surfaces.

8. The dimensioning system according to claim 1, wherein the target range-sensor pose is stored on a non-transitory computer-readable storage medium communicatively coupled with the computing device.

9. The dimensioning system according to claim 1, wherein the target range-sensor pose is adjustable.

10. A method, implemented by a computer, for operating a dimensioning system, the method comprising:
generating adjustment messages to facilitate the positioning of a range sensor of the dimensioning system, the range sensor communicatively coupled to the computer and capable of generating range images, the generating adjustment messages comprising:
recording the range images from the range sensor onto a non-transitory computer-readable storage medium;
reading the range images from the computer-readable storage medium;
processing at least one of the range images to derive a result, comprising computing a difference between an initial range-sensor pose and a target range-sensor pose; and
generating at least one adjustment message based on the result, the at least one adjustment message being generated to facilitate adjustment of the range sensor to more closely align with the target range-sensor pose; and
deriving, from at least one of the range images, dimensions of an object in the field of view.

11. The method according to claim 10, wherein the step of processing comprises identifying at least one planar surface in at least one range image.

12. The method according to claim 11, wherein the step of processing comprises computing the initial range-sensor pose and the target range-sensor pose.

13. The method according to claim 12, wherein the adjustment messages comprise instructions for physically adjusting the range sensor in order to minimize the difference the between the initial range-sensor pose and the target range-sensor pose.

14. The method according to claim 10, wherein the range sensor comprises a projector for projecting a light pattern in a field of view and a range camera for detecting the light pattern in at least part of the field of view, wherein the projector and the range camera are in a stereo arrangement.

15. The method according to claim 10, wherein the adjustment messages comprise range images with superimposed graphics and/or text.

16. The method according to claim 10, wherein the range sensor comprises a color camera.

17. The method according to claim 16, wherein the adjustment messages comprise color images with superimposed graphics and/or text.

18. The method according to claim 10, wherein the adjustment messages comprise audio messages.

19. The method according to claim 10, wherein the adjustment messages comprise visual information displayed on a display communicatively coupled to the computer.

\* \* \* \* \*